United States Patent [19]
McClure et al.

[11] Patent Number: 5,939,885
[45] Date of Patent: Aug. 17, 1999

[54] WELL LOGGING APPARATUS HAVING A SEPARATE MOUNTING MEMBER ON WHICH A PLURALITY OF ANTENNAS ARE LOCATED

[75] Inventors: Paul Anthony Donegan McClure, Aberdeen, United Kingdom; William David Murray; Edward Joseph Beshoory, both of Houston, Tex.

[73] Assignee: Dailey International, Inc., Conroe, Tex.

[21] Appl. No.: 08/759,729

[22] Filed: Dec. 6, 1996

[30] Foreign Application Priority Data

Dec. 6, 1995 [GB] United Kingdom ............... 9524977

[51] Int. Cl.⁶ .............................. G01V 3/18; G01V 3/30; E21B 47/01
[52] U.S. Cl. ........................... 324/338; 175/50; 324/323
[58] Field of Search ................... 324/338–343, 324/369; 166/254.2; 175/40, 41, 50; 250/254; 73/152.03

[56] References Cited

U.S. PATENT DOCUMENTS

| | | |
|---|---|---|
| 3,551,797 | 12/1970 | Gouilloud et al. . |
| 4,511,843 | 4/1985 | Thoraval ............................ 324/338 |
| 4,536,714 | 8/1985 | Clark ................................. 324/338 |
| 4,814,768 | 3/1989 | Chang ............................. 324/338 X |
| 4,968,940 | 11/1990 | Clark et al. ....................... 324/338 |
| 5,453,693 | 9/1995 | Sinclair et al. ................. 324/338 X |
| 5,530,358 | 6/1996 | Wisler et al. ..................... 324/338 |
| 5,563,512 | 10/1996 | Mumby ........................ 324/338 X |
| 5,682,099 | 10/1997 | Thompson et al. ............... 324/338 |

Primary Examiner—Gerard Strecker
Attorney, Agent, or Firm—Arnold White & Durkee

[57] ABSTRACT

Apparatus for sensing the resistivity of geological formations surrounding a borehole includes a tubular body member (1) which is adapted to form a portion of a length of drill string. An antenna (10) is mounted within the body member (1) and the body member (1) has apertures (2) adjacent to the antenna (10) to permit an electro-magnetic signal to pass through the body member (1) after transmission from, or for reception by, the antenna (10).

17 Claims, 3 Drawing Sheets

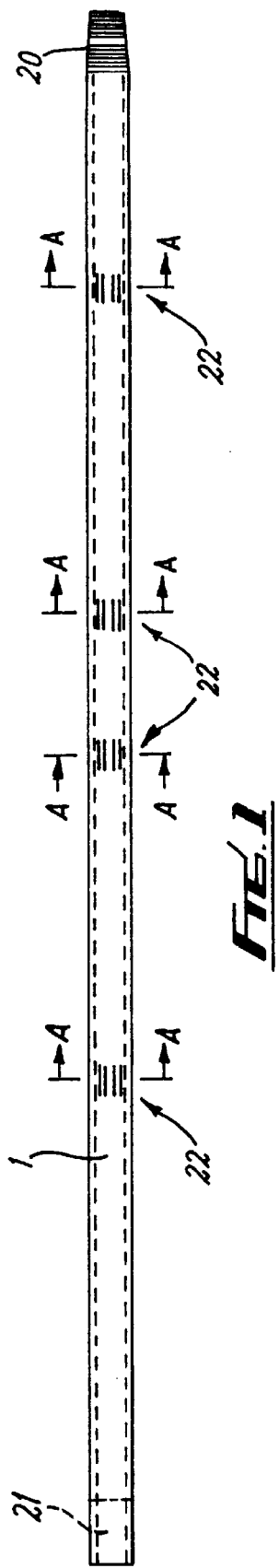
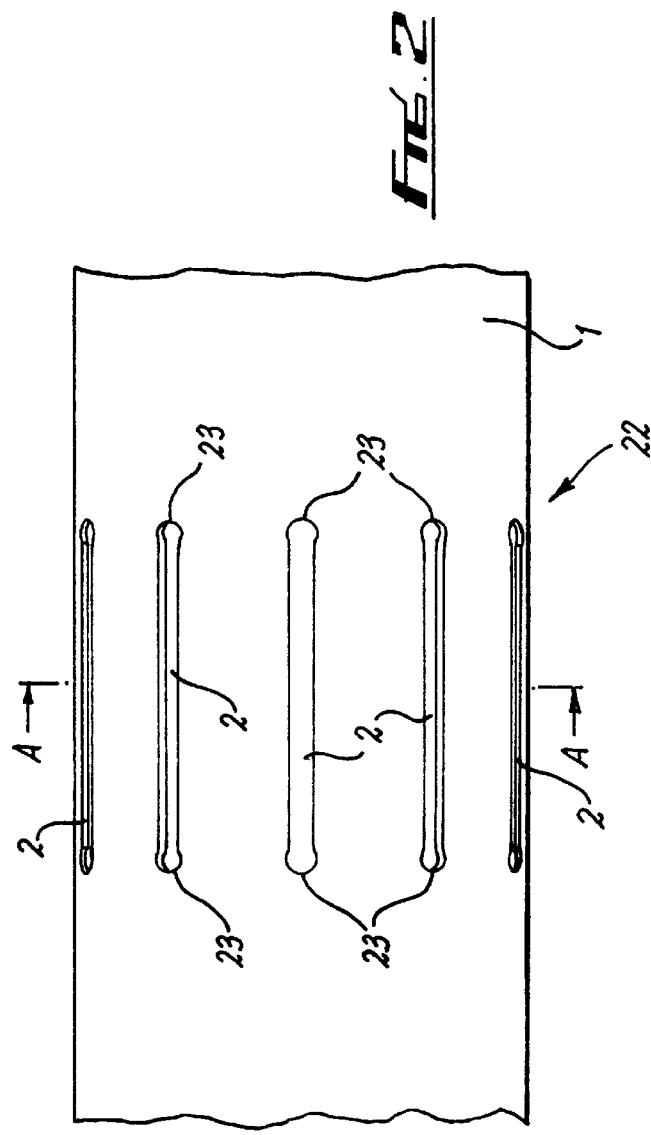

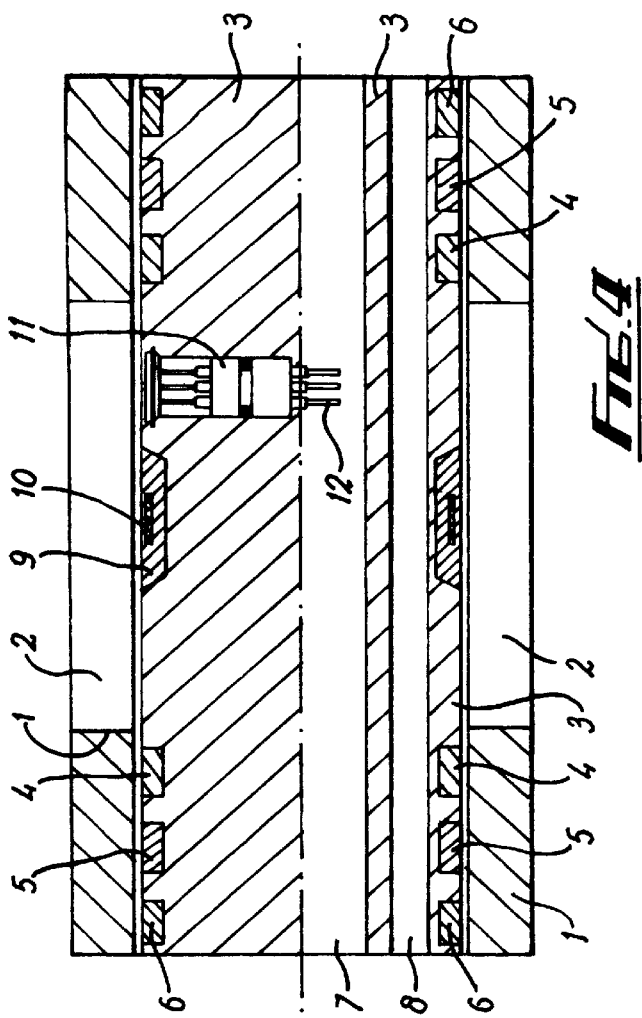
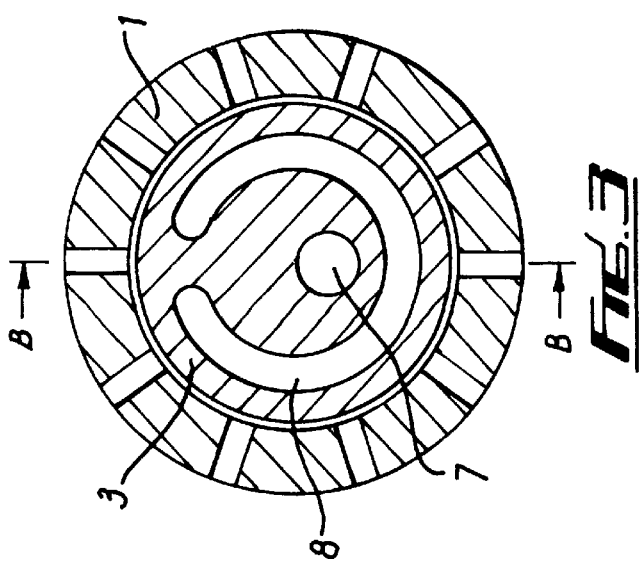
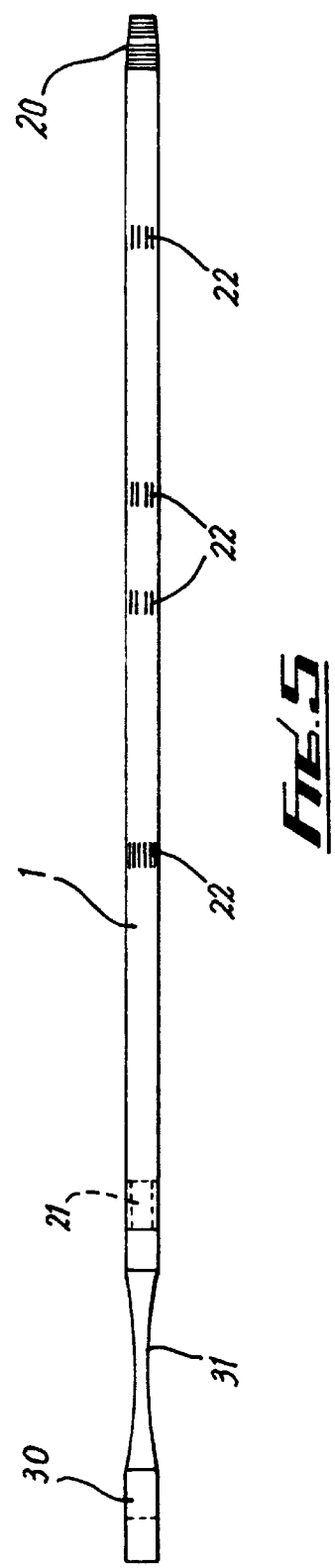

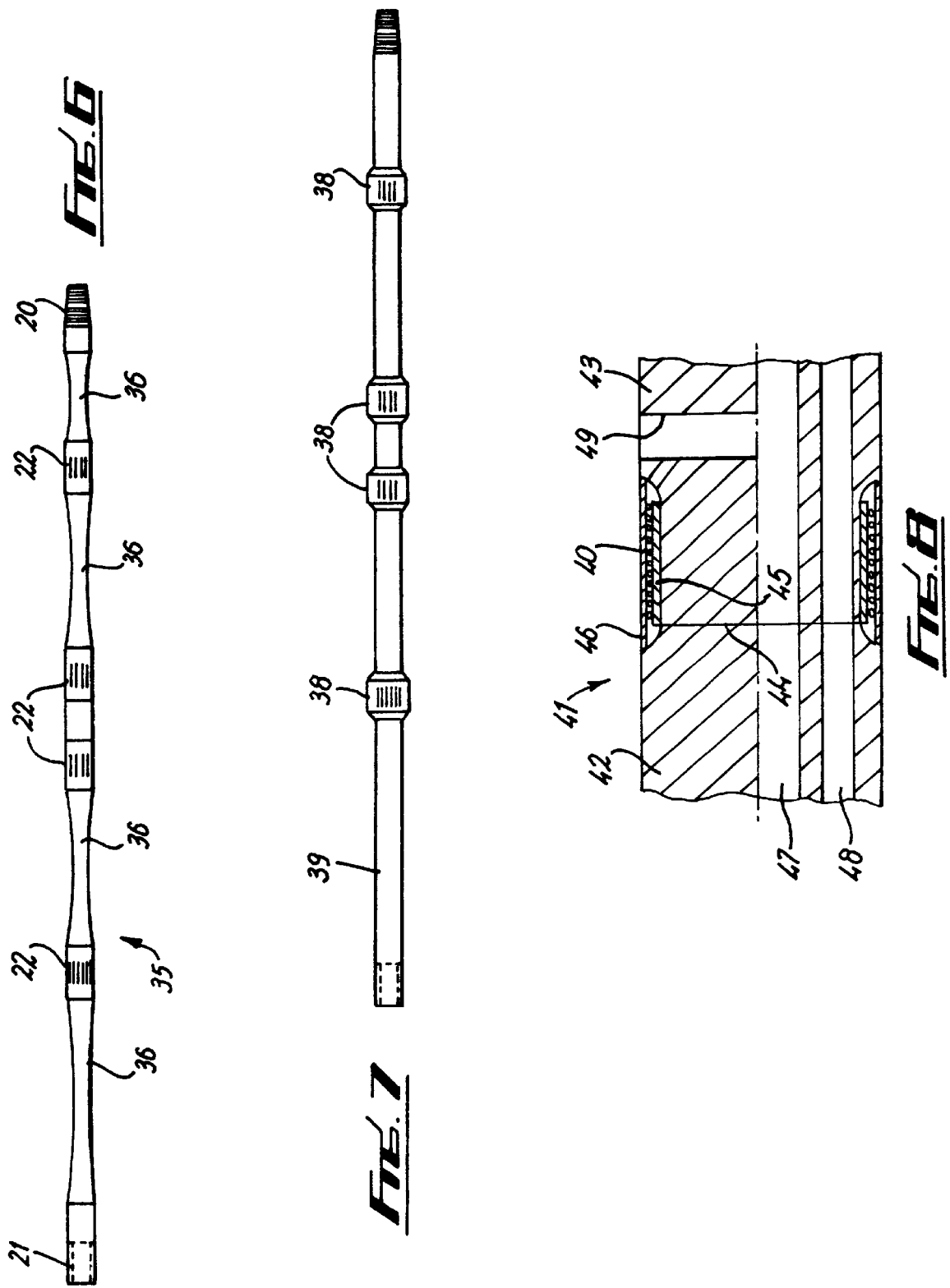

WELL LOGGING APPARATUS HAVING A SEPARATE MOUNTING MEMBER ON WHICH A PLURALITY OF ANTENNAS ARE LOCATED

The invention relates to apparatus for sensing the resistivity of geological formation surrounding a borehole, and preferably apparatus for incorporation into a coil tubing drilling assembly or a conventional drilling assembly.

BACKGROUND OF THE INVENTION

A technique used for evaluating formations surrounding an earth borehole is resistivity logging. Porous formations with high resistivity generally indicate the presence of hydrocarbons whilst porous formations with low resistivity are normally water saturated and contain no hydrocarbon.

Typically, tools used to measure formation resistivity during drilling use a propagated wave and two or more, but typically two, receiver antennas to measure phase delay and attenuation over a predefined interval. Such devices are described in detail in U.S. Pat. No. 3,551,797 and U.S. Pat. No. 4,968,940. All conventional devices for use during drilling use antennas on the outside of a drill collar to transmit or receive the signal.

Antennas on the outside of collars and mandrels are inherently unreliable, even with steel or fibreglass protective clamshell designs such as that disclosed in U.S. Pat. No. 4,536,714. The reason for this is that such protective covers rotate against the well bore wall and because they are attached to the collar by various fixing methods, they are prone to structural failure. Additionally with antennas mounted on the exterior of mandrels or drill collars, high pressure mechanical and electrical sealing systems are required to couple the antennas to the electronics mounted within the mandrel or collar in order to retain the integrity of the system. Such sealing systems are prone to failure and cause reliability problems.

Furthermore, antennas designs of this nature require radial drilling and reduction in diameter of the mandrel to accommodate the standoff which may be a ferrite or other non conductive, non permeable material. The removal and machining of this profile to accommodate the standoff weakens the body of the collar or mandrel considerably which means designs with small diameter collars are impractical. Also, conventional designs require the use of electrostatic shields which are cumbersome and space consuming within the antenna design.

SUMMARY OF THE INVENTION

In accordance with the present invention, apparatus for sensing the resistivity of geological formations surrounding a borehole comprises a tubular body member adapted to form a portion of a length of drill string, an antenna mounted within the body member, and the body member having apertures therein adjacent to the antenna to permit an electromagnetic signal to pass through the body member after transmission from, or for reception by, the antenna.

Preferably, the apparatus comprises two or more antennas mounted within the body member, the antennas being spaced from each other in a direction along the longitudinal axis of the body member, and the body member has apertures therein adjacent to each antenna. Typically, one or more of these antennas is for transmission and one or more antennas are for reception of signals transmitted by the respective transmitter.

Most preferably, the apparatus comprises four antennas spaced from each other along the body member. Two antennas for transmission and the other two antennas for reception of signals transmitted typically symmetrically to the receiver antennas by the transmitter antennas. Preferably, the receiver antennas are located next to each other and one transmitter antenna is located on either side of the receiver antennas.

Preferably, the tubular body member has a greater flexibility in sections of the body member in which said apertures are not located than sections of the body member in which said apertures are located. Typically, said sections have greater flexibility have a diameter which is less than the diameter of said sections in which said apertures are located. Alternatively, or in addition, a flexible member may be located above and/or below the body member, in use.

Typically, the antennas is located on a mounting member located within the body member and the mounting member may also include transmission and/or receiver electronics which are coupled to the antenna.

In one example of the invention, the mounting member may comprise two portions which are detachable to permit the antenna to be mounted on, or removed from, the mounting member.

Preferably, the apertures are in the form of elongated slots, which typically extend in a direction along the longitudinal axis of the body member. Typically, the ends of the slots are curved, and preferably radiused. Preferably, each slot has a width at each end which is greater than the width of the slot between the ends, and where the ends are radiused, the radius of curvature of the ends is greater than half the width of the slot between the ends. Typically, there are a number of apertures which are distributed circumferentially around the body member. Preferably, the apertures are distributed equidistantly around the body member.

Typically, the antennas is a radio frequency antenna and comprises at least one winding which extends circumferentially around the inside of the body member. Preferably, the antenna is mounted on a high permeability low conductivity material on the mounting member. For example the high permeability, low conductivity material may be ferrite, an amorphous alloy material. Alternatively, a composite material which has a low permeability may be used.

The antenna electronics may also include an antenna tuning element.

Preferably the antenna is isolated from fluids in the drill string or the well, by a sealing device located between the mounting member and the body member.

Typically, the antenna may be electrostatically and/or electromagnetically isolated from other sections of the body member or drill string by an electromagnetic and/or electrostatic isolation device which prevents transmission of electromagnetic signals to or from the antenna along the inside of the body member or drill string. Typically, where the antenna is a radio frequency antenna, the isolation device is a radio frequency gasket seal.

Preferably, the body member comprises a non-magnetic material in the vicinity of the antenna. For example, the body member could be manufactured from Inconel X-750.

Typically, the body member may be a drill collar or alternatively, a mud motor housing.

Preferably, the mounting member may include a fluid passageway to permit passage of fluids through the body member.

Typically, the drill string of which the body member forms a section may be a conventional drill string such as that used for conventionally drilling oil and/or gas wells. Alternatively, the drill string may be a coil tubing drill string, or indeed any other suitable drill string used for drilling boreholes.

BRIEF DESCRIPTION OF THE DRAWINGS

Examples of apparatus for sensing the resistivity of a geological formation surrounding a borehole in accordance with the invention will now be described with reference to the accompanying drawings, in which:

FIG. 1 is an external plan view of a first example of a drill collar;

FIG. 2 is a detailed plan view of a slotted portion of the drill collar shown in FIG. 1;

FIG. 3 is a cross-sectional view along the lines A—A in FIGS. 1 and 2;

FIG. 4 is a cross-sectional view along the line B—B in FIG. 3;

FIG. 5 is a plan view of the drill collar of FIG. 1 connected to a flex collar;

FIG. 6 is a plan view of a second example of a drill collar;

FIG. 7 is a plan view of a third example of a drill collar; and,

FIG. 8 is a cross-sectional view through an alternative mounting member.

DESCRIPTION OF THE PREFERRED EMBODIMENTS

FIG. 1 shows an external plan view of a drill collar 1 forming a threaded male connector 20 at one end and a threaded female connector 21 at the other end. Spaced along the drill collar 1 are four slotted portions 22. FIG. 2 is an exploded plan view of one of the slotted regions 22 portion of a body member 1. Each slotted region 22 has a number of slots 2 formed in it which extend through the side wall of the drill collar 1. The slots 2 are equispaced around the circumference of the drill collar 1. The drill collar 1 forms part of a length of drill string, such as a conventional drill string or coil tubing drill string. The drill collar 1 is manufactured from a non-magnetic material and for example, may be Inconel X-750 or any similar material. For example, the drill collar 1 could be a non-magnetic drill collar or a mud motor housing which is non-magnetic.

As shown in FIG. 2, the slots 2 each have radiused ends 23. The radiused ends 23 each have a radius which is greater than half the width of the slots 2 between the radiused ends 23. The advantage of these enlarged radiused ends 23 is that they reduce stresses in the material by distributing the stresses over a longer length than if the radius was equal to half the slot width.

As shown in FIGS. 3 and 4, a mounting member 3 in the form of an instrument housing is located within the drill collar 1 and is mounted inside the drill collar 1 by means of two high pressure O-rings 4 with dual backup, two electrostatic/electromagnetic radio frequency gasket seals 5 and two wiper/backup seals 6. Located within the mounting member 3 is a void 7 in which transmitter or receiver electronics may be located. The mounting member 3 also has a fluid passageway 8 therein which permits the flow of drilling fluids from above the drill collar 1 in the drill string to below the drill collar 1 in the drill string.

Located in a recess on the outside of the mounting member 3 is a high permeability, low conductivity material 9 which is the form of an annular ring which extends round the mounting member 3. Formed within the material 9 are a number of turns of wire which form an antenna 10. The antenna 10 is coupled to a high pressure radio frequency feedthrough connector 11 which in turn is connected to the transmitter or receiver radio frequency electronics by a shielded, twisted pair connection 12. Alteratively, a single wire coaxial connection could be used.

An alternative mounting member 41 is shown in FIG. 8. In FIG. 8 the feedthrough connector 11 is not inserted but would be inserted in recess 49. The mounting member 41 has two sections 42, 43 which may be removably connected together at joint 44. The mounting member 41 still has a void 47 for housing transmitter or receiver radio frequency electronics and a fluid passageway 48. However, the antenna takes the form of a modular assembly which includes an antenna 40 and a stand-off 45 of a high permeability, low conductivity which isolates the antenna 40 from sections 42, 43. The antenna 40 is covered by a tubular ceramic sheath 46 which may be welded in position or sealed by O-rings (not shown). Hence, the antenna 40 and stand-off 45 may be easily slid on and off section 43 after the sections 42, 43 have been disconnected.

The mounting member 41 has the advantage that the antenna may be removed and replaced more easily than with the mounting member 3 shown in FIGS. 3 and 4, which requires the antenna to be wound and unwound form the member 3.

From FIG. 4 it can be seen that the antenna 10 extends circumferentially around the mounting member 3 but is mounted within the drill collar 1. The presence of the slots 2 on the drill collar 1, adjacent to the antenna 10 permits radio frequency signals to pass through the drill collar 1 either to or from the antenna 10. Hence, the antenna 10 may receive radio frequency signals from a geological formation in which the drill collar is located via the slots 2 in the drill collar 1, if receiver electronics are located in the void 7 and coupled to the antenna 10 via the feedthrough connector 11.

Alternatively, the antenna 10 may transmit radio frequency signals through the apertures into a geological formation in which the drill collar 1 is located if transmitter electronics are locate din the void 7 and coupled to the antenna 10 via the feedthrough connector 11.

Typically, the antenna support and electronics housing may be a beryllium copper (BeCu) alloy or similar material.

Typically, four antennas are mounted in the drill collar 1 adjacent each of the slot portions 22, and spaced apart from each other along the longitudinal axis of the drill collar. Two antennas are for transmission of radio frequency signals into the geological formation and the other two antennas are for reception of radio frequency signals from the geological formation which have been transmitted by the transmitter antennas.

FIG. 5 shows the drill collar 1 connected to a flex sub 30 located above the drill collar 1. The use of the flex sub 30 has the advantage of reducing stress in the drill collar 1 by the drill string being able to flex immediately above the drill collar 1 at the flex sub 30. The flex sub 30 incorporates a scallop 31 along its length which makes it more flexible than the drill collar and thereby reducing flexing stresses in the drill collar 1 and in particular, reduces localised stresses at the slotted regions 22. Alteratively, the flex sub 30 could be located below the drill collar 1, or two flex subs could be sued, one above and one below the drill collar 1 in the drill string.

As an alternative, or in addition, to the flex sub 30, the flexibility of the drill collar away from the slotted regions 22 could be increased. For example, FIG. 6 shows an example of a drill collar 35 which has scalloped sections 36 which reduce localized stresses at the slotted regions 22.

As an alternative to scalloping sections of the drill collar, it would also be possible to provide enlarged diameter slotted portions 38, as shown in the drill collar 39 of FIG. 7. Hence, bending of the drill collar 39 is promoted away from the slotted regions 38, and localised stresses at the slotted regions 38 are reduced.

Advantages of the invention are that the antenna is mounted within the drill collar, for example a non magnetic drill collar, which provides additional protection to the antenna during drilling operations.

In addition, as the antenna 10 is mounted on a mounting member which is removably mounted within the drill collar, there is the advantage that the antenna 10 and/or radio frequency electronics may be repaired or replaced more straight forwardly than in situations where the antenna actually forms part of the drill collar.

Typically, the number of slots 2 in the drill collar may be six or more, and there are ten slots 2 in each slotted portion 22 in the drill collar 1. However, the choice of the number of slots would depend on the diameter of the drill collar in which the apparatus is used. The advantage of this is that mounting the antenna 10 within the drill collar 1 does not involve a reduction in the thickness of the drill collar 1 and therefore permits this type of resistivity tool to be used in smaller diameter drilling systems than was previously possible, for example, in cold tubing drilling system.

We claim:

1. Apparatus for sensing the resistivity of geological formations surrounding a borehole comprising a tubular body member adapted to form a portion of a length of drill string, an antenna mounted on a mounting member located within a bore of said body member, and said body member having apertures therein adjacent to said antenna to permit an electromagnetic signal to pass through said body member after transmission from, or for reception by, said antenna, wherein the mounting member comprises two portions which are detachable to permit the antenna to be mounted on or removed from the mounting member.

2. Apparatus according to claim 1, wherein the antenna comprises a modular assembly.

3. Apparatus according to claim 2, wherein the modular assembly is removably located on one of the two portions.

4. Apparatus according to claim 3, wherein the modular assembly comprises an antenna wire, and a stand-off which isolates the antenna wire from the mounting member.

5. Apparatus according to claim 4, wherein the stand-off comprises a high-permeability, low-conductivity material.

6. Apparatus according to claim 2, wherein the antenna is covered by an annular sheath.

7. Apparatus according to claim 6, wherein the annular sheath comprises a ceramic sleeve.

8. Apparatus according to claim 7, wherein the annular sheath is secured in position by welding.

9. Apparatus according to claim 1, including a seal located between the mounting member and the body member.

10. Apparatus according to claim 9, wherein the seal comprises at lest one O-ring.

11. Apparatus according to claim 1, wherein the body member comprises a drill collar.

12. Apparatus according to claim 1, wherein the body member comprises a mud motor housing.

13. Apparatus according to claim 1, wherein the body member is manufactured from a non-magnetic material.

14. Apparatus according to claim 13, wherein the body member is manufactured from an INCONEL™ series steel.

15. Apparatus according to claim 1, wherein the antenna is mounted on high permeability, low conductivity material selected from the group consisting of ferrite and amorphous alloy material.

16. Apparatus according to claim 1, wherein the body member forms part of a coil tubing drilling assembly.

17. Apparatus according to claim 1, wherein the antenna includes a tuning element.

* * * * *